(12) United States Patent
Yamamoto et al.

(10) Patent No.: US 7,564,198 B2
(45) Date of Patent: Jul. 21, 2009

(54) DEVICE AND METHOD FOR DRIVING LED

(75) Inventors: Kenji Yamamoto, Kanagawa (JP); Richard Lum Kok Keong, Singapore (SG)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 154 days.

(21) Appl. No.: 11/847,273

(22) Filed: Aug. 29, 2007

(65) Prior Publication Data

US 2008/0094000 A1    Apr. 24, 2008

(30) Foreign Application Priority Data

Aug. 29, 2006    (JP) .............................. 2006-232786

(51) Int. Cl.
H05B 37/00    (2006.01)
(52) U.S. Cl. ...................... 315/307; 315/192; 315/193

(58) Field of Classification Search ............. 315/185 R, 315/193, 191, 192, 209 R, 291, 307
See application file for complete search history.

(56) References Cited

U.S. PATENT DOCUMENTS 7,081,722 B1 * 7/2006 Huynh et al. ................ 315/323
2007/0290625 A1 * 12/2007 He et al. ...................... 315/274

* cited by examiner

*Primary Examiner*—David Hung Vu

(57) ABSTRACT

An LED lighting device of AC power-driven type having a comparatively simple constitution and a high power efficiency. The device compares a signal voltage (rectified voltage) obtained by rectifying an AC source with a predetermined reference voltage and controls ON/OFF of a driving current to each LED of an LED array in response to a comparison result. In this constitution, a large voltage of AC source enables lighting of more number of LEDs, while a small voltage thereof enables lighting of less number of LEDs, thus enhancing power efficiency of the LED lighting device.

13 Claims, 9 Drawing Sheets

PRIOR ART

PRIOR ART

DEVICE AND METHOD FOR DRIVING LED

CROSS REFERENCE TO RELATED APPLICATION

This application is entitled to the benefit of Japanese Patent Application Number 2006-232786, filed on Aug. 29, 2006, the disclosure of which is incorporated herein by reference.

FIELD OF THE INVENTION

The present invention relates to a light emitting diode (LED) lighting device, and particularly to an LED lighting device suitable for a lighting system and a lighting method thereof.

BACKGROUND OF THE INVENTION

A constitutional example of a conventional LED drive unit, which drives an LED by a commercial AC source and is applicable to a lighting system, is described by referring to the drawings.

FIG. 8 is a schematic view showing one embodiment of an LED lighting device according to prior art. In the figure, there are provided a commercial AC source 400; a full-wave rectifier circuit 401 comprised of rectifier diodes $401_1$ to $401_4$ for rectifying the commercial AC source; a current-limiting resistor 402 connected to a plus output terminal A of the full-wave rectifier circuit 401 for limiting a current flowing through an LED array 403; the LED array 403 having N number (N≧1) of LEDs $403_1$ to $403_N$ connected in series; a capacitor 404 for smoothing an output of the full-wave rectifier circuit (see FIG. 7 of Japanese Patent Laid-Open Publication No. H11-67,471, for example).

FIG. 9 shows another LED lighting device having a power transformer 506 provided therewith according to prior art. There are provided a current-limiting resistor 502 and a capacitor 504 for smoothing. In FIGS. 8 and 9, like reference numerals refer to like elements. The power transformer 506 is for stepping down a voltage of the commercial AC source to a required level, and this allows a modification in the number of LEDs 403 in series depending on the design purpose.

FIG. 10 shows still another LED lighting device according to prior art. For power conversion efficiency, the device has a DC/DC converter 604 with a transformer (not shown) built-in. There are provided a current-limiting resistor 602. Like numerals refer to like elements in FIGS. 8 and 10.

In the conventional constitution as shown in FIG. 8, the capacitor 404 with a high voltage and a large capacity has to be used to supply a voltage higher than the total sum of forward voltages of LEDs, disadvantageously resulting in a larger and expensive device. Further, the current-limiting resistor 402 incorporated in a current pathway to LEDs always has a current flow for lighting all the LEDs. Thus, a disadvantage with the device is that power consumption at the current-limiting resistor is large.

In the conventional constitution as shown in FIG. 9, the device has a large size and weight and is expensive due to the provision of the power transformer. Further, the device has a problem in that power consumption at the current-limiting resistor is still large.

In the conventional constitution as shown in FIG. 10, it is expected that power efficiency is improved due to the provision of the DC/DC converter in comparison with the constitutions of FIGS. 8 and 9. However, in addition to the DC/DC converter having a transformer built-in, an EMI filter for suppressing noises generated by the DC/DC converter is required, disadvantageously resulting in a larger and expensive device.

As described above, all of the LED lighting devices according to prior art cannot simultaneously solve both problems in terms of size/cost and power efficiency. Further, the device having a DC/DC converter additionally requires an anti-noise measure. The problem of power efficiency becomes particularly serious when a lighting system using white LEDs is designed as an alternative to an electric bulb or a fluorescent lamp.

SUMMARY OF THE INVENTION

Therefore, an object of the present invention is to provide an LED lighting device and a lighting method thereof, which have high power efficiency and do not require a particular anti-noise measure. Another object of the present invention is to provide an LED lighting device having a smaller size and a simple constitution (thus inexpensive) without a capacitor having a large voltage and a large capacity, a power transformer, and a DC/DC converter.

The present invention provides an LED lighting device, which lights an LED array comprised of a plurality of series-connected LEDs by an AC power, which selectively controls lighting or lighting-out of each LED of the LED array depending on the magnitude of AC source voltage thereby to efficiently utilize AC source.

According to one embodiment of the present invention, a signal voltage (hereafter "rectified voltage") obtained by rectifying an AC source is compared with a predetermined reference voltage. When the AC source voltage is larger than the reference voltage, more LEDs are lit up. When it is smaller, less LEDs are lit up. In this case, it is preferable to light up such a maximum number of LEDs that can be lit up by the source voltage at any given point in time in order to efficiently utilize a power source.

The present invention can provide an LED lighting device with high power efficiency. Further, the present invention can provide such an LED lighting device with a more reduced size at a lower cost without taking a particular anti-noise measure.

Other aspects and advantages of the present invention will become apparent from the following detailed description, taken in conjunction with the accompanying drawings, illustrated by way of example of the principles of the invention.

DETAILED DESCRIPTION

The present invention will be described based on specific constitutions of embodiments. However, before that, an operational concept thereof will be described by referring to FIGS. 3 and 4.

Figure 3:
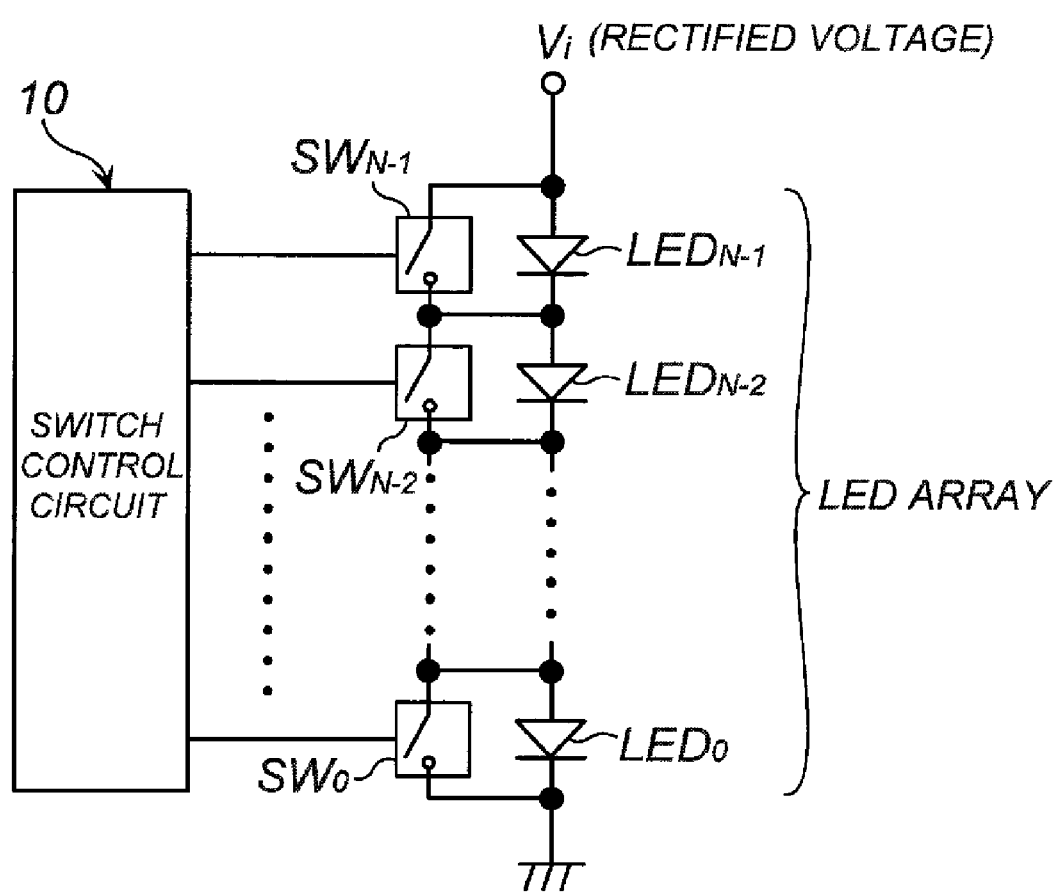
FIG. 3 is a schematic diagram of a constitution for explaining an operation of one embodiment of the present invention.
Figure 4:
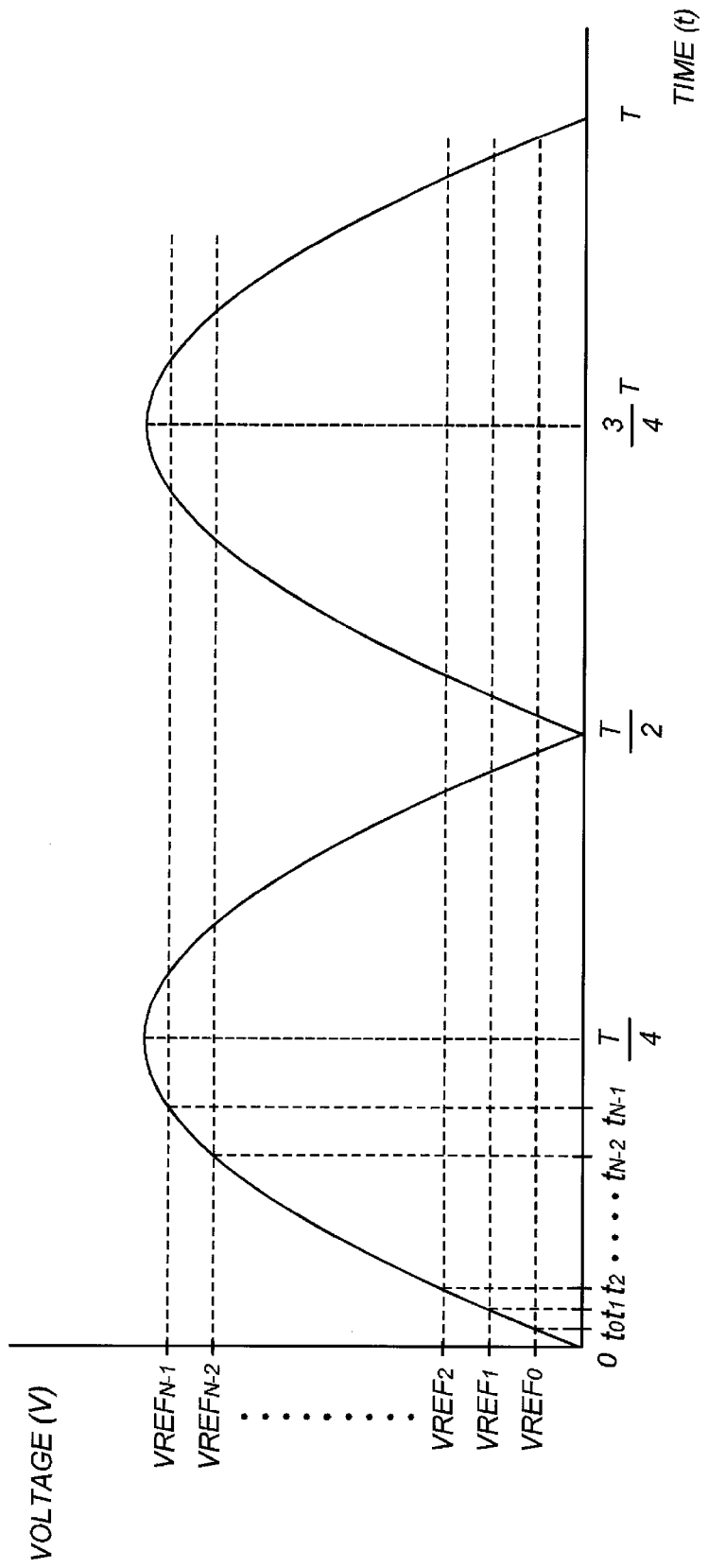
FIG. 4 shows a waveform of a rectified voltage by rectifying an AC source waveform with a full-wave rectifier circuit.

FIG. 3 is a schematic block diagram for explaining an operation of one embodiment of the present invention. FIG. 4 shows a waveform of a rectified voltage over one periodic time T thereof (for example, T=1/50 sec.), which is obtained by full-wave rectifying an AC source waveform.

As shown in FIG. 3, a rectified voltage $V_i$ is applied to an LED array having series-connected N number of LEDs ($LED_0$ to $LED_{N-1}$: N is properly determined depending on the embodiment requirements) to drive the LEDs. Each of $SW_0$ to $SW_{N-1}$ is an on/off switch of a driving current to a corresponding LED. When a switch is on, an anode and a cathode of a corresponding LED are short-circuited so that no current flows across that LED. When the switch is off, a current flows across the corresponding LED to light the LED. This on-off of switch is controlled by a switch control circuit 10.

The switch control circuit 10 preferably controls the switches to light such a maximum number of LEDs that can be lit up by a rectified voltage generated at any given point in time in order to efficiently utilize a power source. Thus, such preferable case is described herein. That is, when such a maximum number of LEDs that can be driven by a rectified voltage applied at a given time is k ($0<k\leq N$), the switch control circuit 10 controls $SW_0$ to $SW_{N-1}$ so as to flow a current to k number of LEDs. For simple explanation herein, supposing that the forward voltage is the same among all the LEDs, any of k number of switches may be turned off. For example, $SW_0$ to $SW_{k-1}$ are turned off and other switches are turned on (in this case, if more number of switches than k are turned off, all the LEDs are not lit).

To determine a maximum number of LEDs drivable by a rectified voltage, it is necessary to define the magnitude of a rectified voltage at any given time. In this embodiment, such determination is performed by comparing a rectified voltage with a predetermined reference voltage.

In FIG. 4, $VREF_0$, $VREF_1$, $VREF_2$, ... $VREF_{N-2}$, and $VREF_{N-1}$ represent N number of reference voltages different from each other, and they satisfy $VREF_0 < VREF_1 < VREF_2 < ... < VREF_{N-2} < VREF_{N-1}$.

When a rectified voltage Vi satisfies $VREF_0 \leq V_i < VREF_1$, $VREF_1 \leq Vi < VREF_2$, ..., $VREF_{N-2} \leq Vi < VREF_{N-1}$, or $VREF_{N-1} \leq V_i$, these reference voltages are set so that a maximum number of drivable LEDs is, for example, 1, 2, ..., or N-1, respectively. In practice, these reference voltages can be determined based on a forward voltage of each LED.

The operation of the device when a reference voltage is set as described above is explained as follows with respect to the time (=T/4) up to ¼ cycle of a rectified voltage waveform in FIG. 4 along the time axis. Up to the period of 0 to t0, a rectified voltage is smaller than the reference voltage $VREF_0$, so the number of LEDs to be lit is zero. Likewise subsequently, 1, 2, ..., N-1, N number of LEDs can light up during the time periods $t_0$ to $t_1$, $t_1$ to $t_2$, ..., $t_{N-2}$ to $t_{N-1}$, and $t_{N-1}$ to T/4. For the remaining ¼ time period from T/4 to T/2, the number of LEDs to be lit is determined in the same manner. However, in this case, as the rectified voltage decreases, the number of LEDs to be lit decreases step-by-step from N depending on the intersection of each reference voltage and a rectified voltage.

Figure 5:
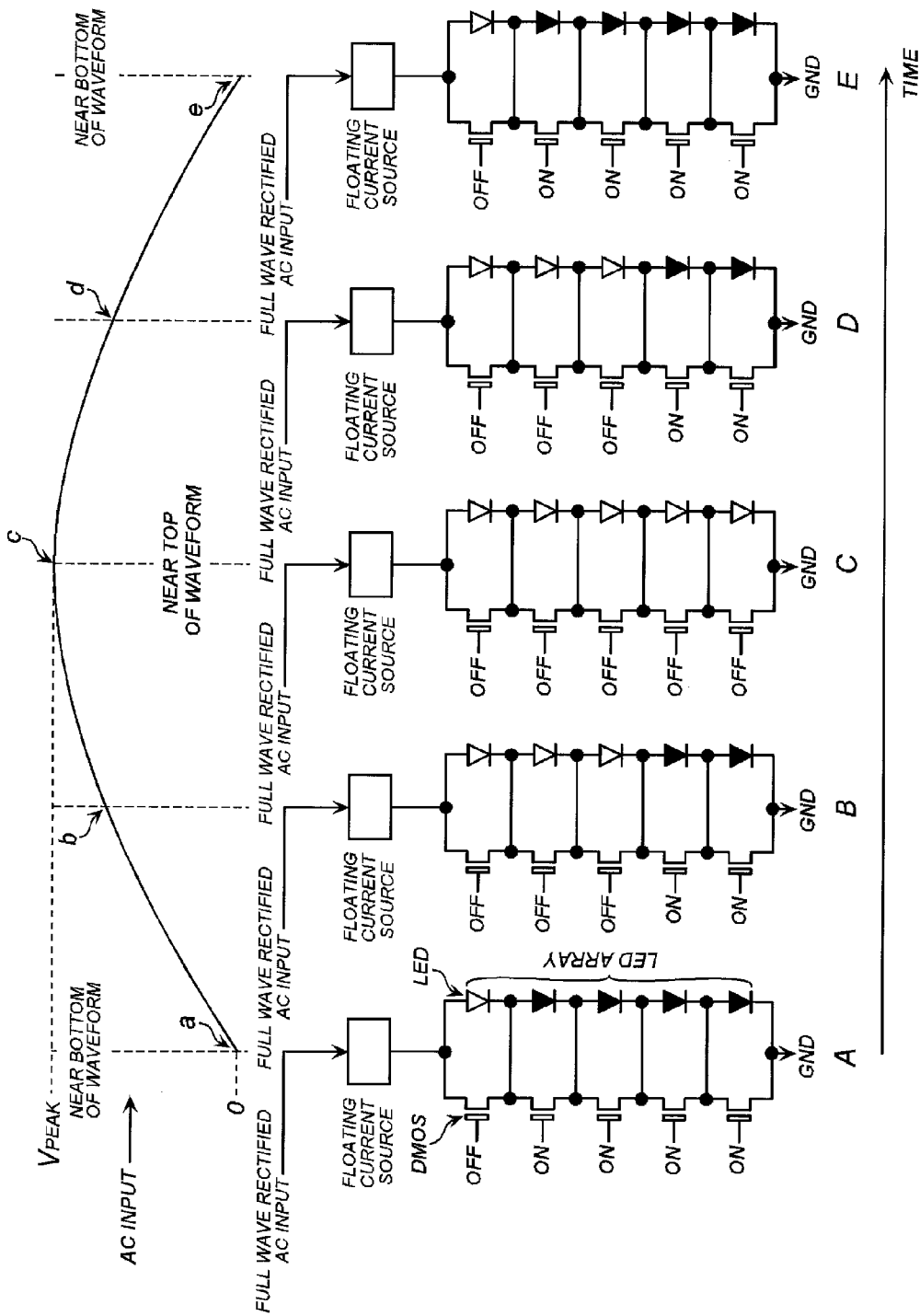
FIG. 5 is a drawing for explaining the condition of lighting/lighting-out of LEDs as the rectified voltage changes in the case of an LED array having five series-connected LEDs.

Next, FIG. 5 is used to explain how the lighting/lighting-out conditions of five LEDs connected in series in an LED array are controlled and changed as the rectified voltage changes.

As constituent elements corresponding to switches ($SW_0$ to $SW_{N-1}$) in FIG. 3, DMOS (Double Diffused MOS) transistors having a low on-resistance are used herein. A floating current source is for limiting a current to the LED array. The floating current source has a voltage input of from 0 (minimum) to $V_{PEAK}$ (maximum) in a voltage range of full-wave rectified AC input, that is, a voltage range of rectified voltage.

In the figure, DMOS gates connected to "ON" lines are driven so that DMOSs are in an ON state, while DMOS gates connected to "OFF" lines have zero volts and are in an OFF state. Depending on ON/OFF state of DMOS, an LED connected to each DMOS is lit out or lit up (LED with a white space is lit up and LED with solid black is lit out).

In the neighborhood (position a or e on the waveform in the figure) where a rectified voltage waveform has a minimum value, the uppermost DMOS is OFF and one LED connected thereto is lit up, while DMOSs there below are ON and all the lower four LEDs are lit out, as indicated as A or E. In the neighborhood (position c on the waveform in the figure) where the rectified voltage waveform has a maximum value, all the DMOSs are OFF and all the five LEDs are lit up, as indicated as C. In portions between these two positions (for example, position b or d on the waveform in the figure), two or more DMOSs are ON and other DMOSs are OFF in response to the value of a rectified voltage, as indicated as B or D. As described above, LEDs are lit up or lit out in sequence like up-and-down liquid column of a temperature indicator in response to changes in the magnitude of rectified voltage.

Source and drain of an on-state DMOS herein have a voltage close to zero. This indicates that it is not necessary to apply a high source voltage as a voltage for such DMOS gate, which is very important for DMOS safe operation. That is, the DMOS gate can be turned on/off with a low voltage, and a high voltage occurs only between source and drain of an off-state DMOS. In such a constitution, a high rectified voltage increases off-state DMOSs, and therefore a voltage applied to DMOSs are divided for many off-state DMOSs connected in series, so that each off-state DMOS has a smaller source-drain voltage of each off-state DMOS decreases. In the constitution shown in the figure, each DMOS source-drain voltage is clamped by a forward voltage of a corresponding LED.

For convenience of explanation, five LEDs are connected in series in the embodiment. However, it is desirable in a practical circuit that an LED array has more number of series-connected LEDs for minimizing a power loss at a floating current source and optimizing efficiency in use of rectified voltage.

1. First Embodiment

Figure 1:
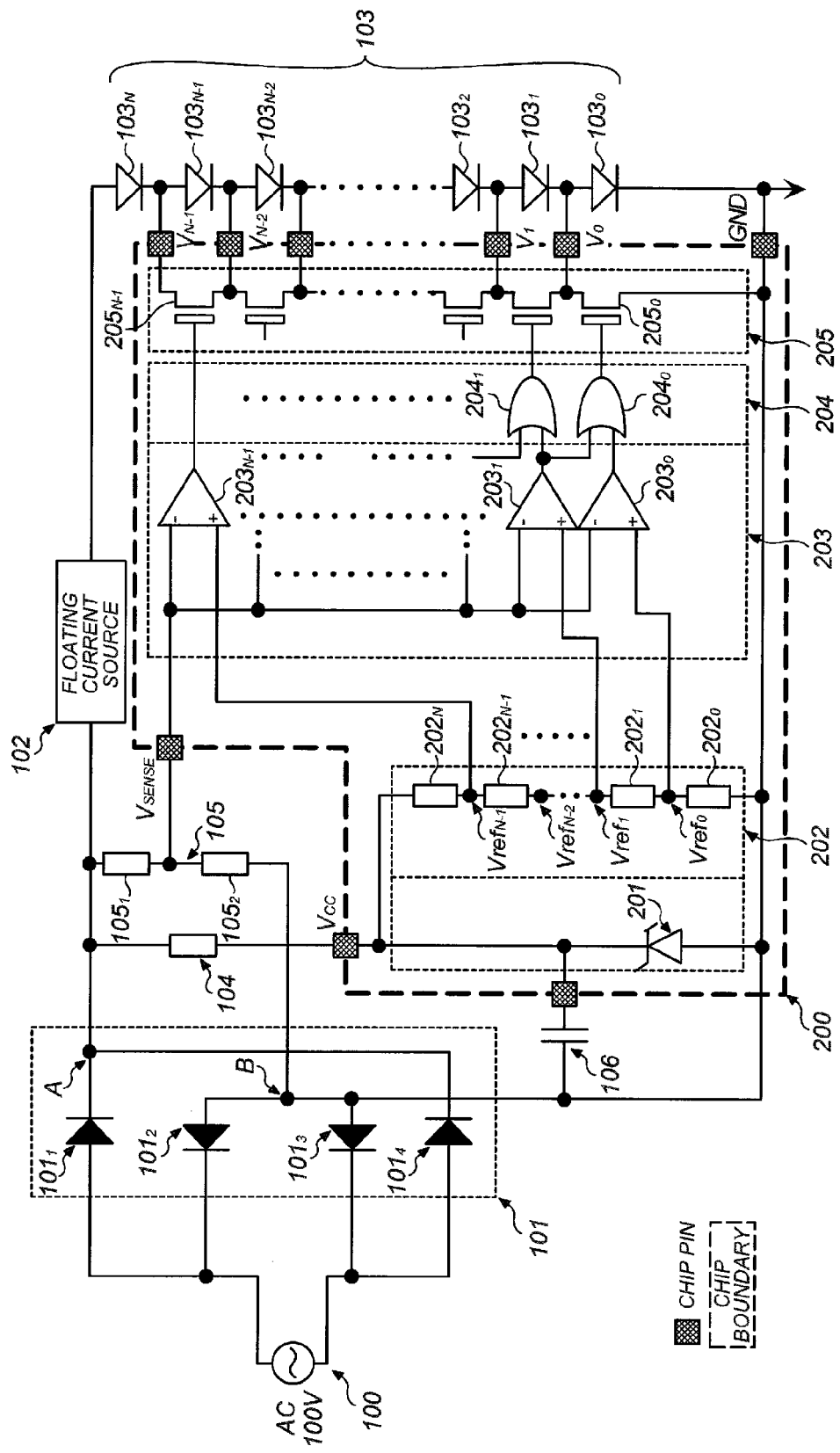
FIG. 1 is a schematic block diagram of an LED lighting device according to a first embodiment of the present invention.

Hereafter, a first embodiment of the present invention is described by referring to FIG. 1. FIG. 1 is a schematic block diagram of an LED lighting device according to the first embodiment of the present invention.

Figure 8:
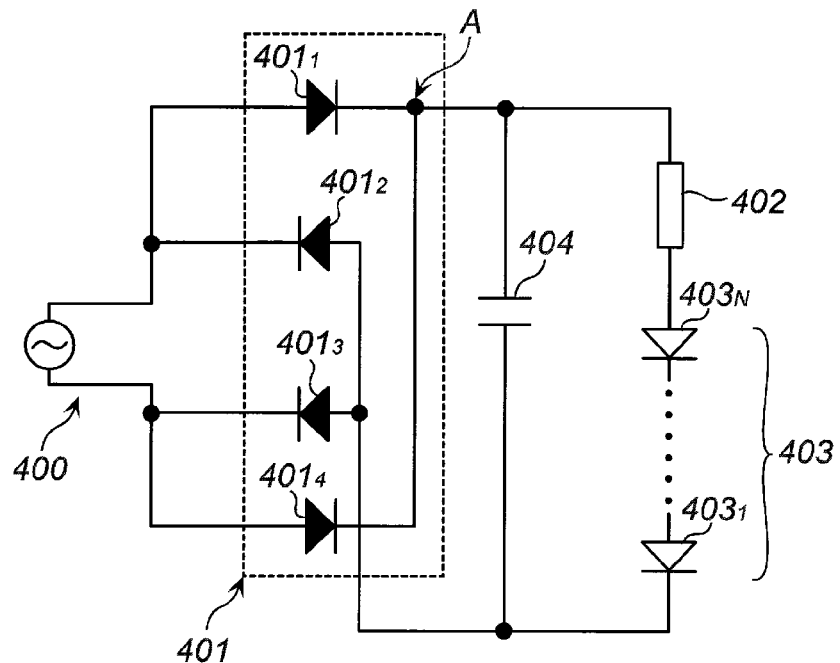
FIG. 8 is a schematic drawing showing an LED lighting device according to prior art.
Figure 9:
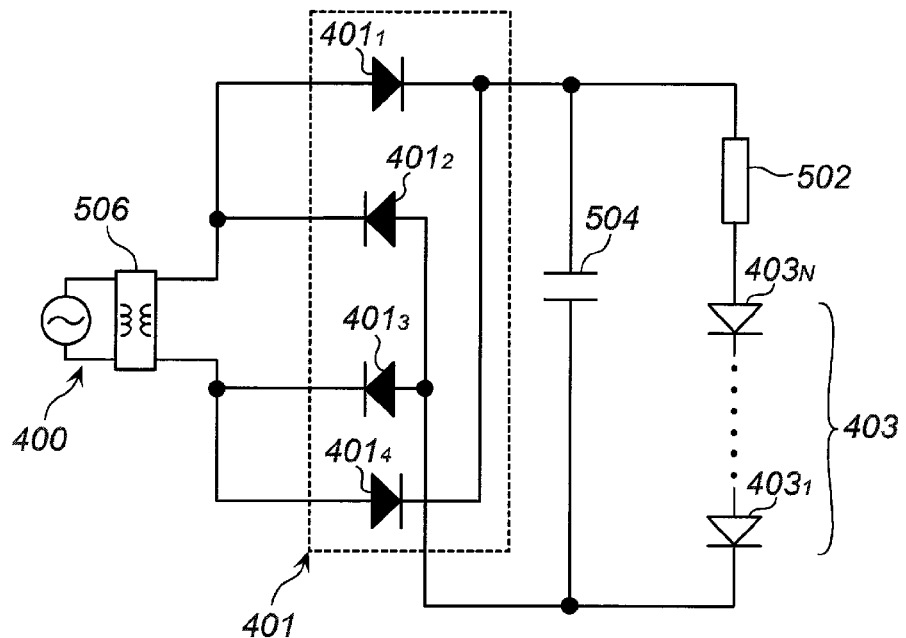
FIG. 9 is a schematic drawing showing another LED lighting device according to prior art.
Figure 10:
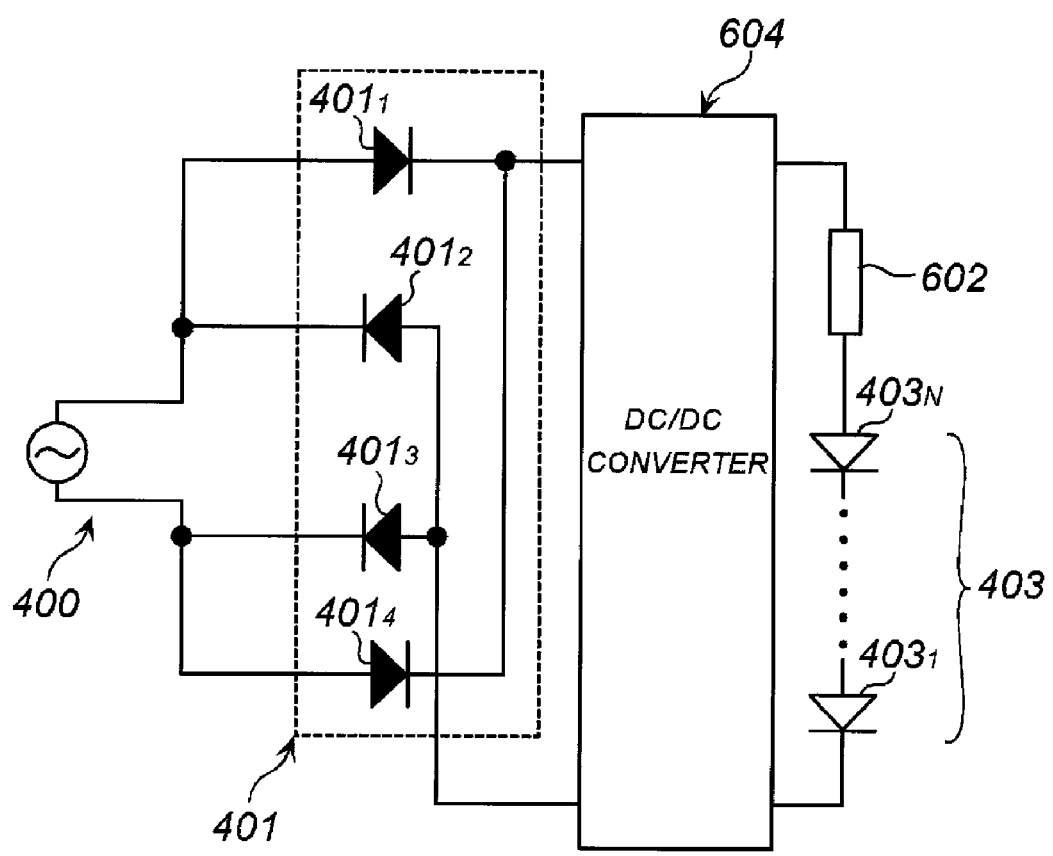
FIG. 10 is a schematic drawing showing further another LED lighting device according to prior art.

An AC source 100 and a rectifier circuit 101 in FIG. 1 may be similar to those of conventional constitutions shown in FIGS. 8 to 10. As the AC source for an LED lighting device, a commercial source (having, for example, 100V to 220V and 50 Hz to 60 Hz) is generally used in consideration general versatility, but an AC source other than a commercial source may be used. Use of a single-phase AC source is assumed in this embodiment, but three-phase AC, etc. may be used as the source.

Numeral 101 denotes a full-wave rectifier circuit comprised of four rectified diodes $101_1$, $101_2$, $101_3$, and $101_4$, which rectifies a commercial AC source to output a rectified voltage waveform, as exemplified in FIG. 4, between a plus output terminal A and a minus output terminal B.

Numeral 102 denotes a floating current source connected to the plus output terminal A of the full-wave rectifier circuit 101 for controlling an amount of the current flowing through an LED array 103, the constitution and operation of which will be described below.

Numeral 103 denotes an LED array wherein N+1 number of high-intensity LEDs $103_0$ to $103_N$ are connected in series. Among these LEDs, N number of LEDs $103_0$ to $103_{N-1}$ are controlled to be lit or short-circuited by an LED lighting control circuit in a below-described chip 200. In this embodiment, high-intensity LEDs are used for the intention to apply to a solid-state illumination apparatus, but LEDs having an ordinary intensity may be used. For simple explanation, it is assumed that all the LEDs have the same forward voltage.

Numeral 104 denotes a current-limiting resistor for limiting a current to the chip 200. One terminal of the resistor is connected to the plus output terminal A of the full-wave rectifier circuit 101 and the other terminal is connected to a power terminal (VCC) of an IC chip. The other terminal is also connected to a holding capacitor 106 and a cathode of a Zener diode 201, which are described below.

Numeral 105 denotes a voltage divider connected between output terminals A and B of the rectifier circuit 101 for dividing an output voltage (rectified voltage) of the rectifier circuit 101 by resistors $105_1$ and $105_2$ and supplying the divided voltage to a terminal $V_{SENSE}$ of the chip 200. This voltage division is for adapting the voltage to voltage endurance characteristics of the IC chip of the LED lighting control circuit 200 described below. Resistance values of the resistors $105_1$ and $105_2$ are determined so as to fall within such a voltage range that the LED lighting control circuit in the chip 200 can deal with as an input voltage at the $V_{SENSE}$ terminal (the resistance values of the resistors $105_1$ and $105_2$ can be set to 135 kohm and 5 kohm so that a voltage at the $V_{SENSE}$ terminal is 5 V when the plus output terminal A has a peak voltage of 140 V).

Numeral 106 denotes a holding capacitor connected to the minus output terminal B of the full-wave rectifier circuit 101. The holding capacitor works together with the Zener diode 201 to supply a stable DC voltage to the chip power terminal VCC. The holding capacitor 106 is connected in parallel to the Zener diode 201. An exemplary voltage value at the chip power terminal VCC is 5 V and the holding capacitor has a capacity of, for example, 0.1 μF.

A section 200 enclosed by a bold broken line is one chip carrying the LED lighting control circuit (hereafter simply referred to as control circuit), which will be described below. The circuit operates to selectively control lighting or short-circuit of each LED in the LED array 103, in response to the magnitude of voltage at the terminal VSENSE, or the magnitude of AC power voltage. Hereafter, the chip 200 is also referred to as a control circuit 200.

Next, the constitution of the control circuit 200 will be described. Numeral 202 denotes a reference resistor row for generating a plurality of different reference voltages, which is comprised of N+1 number of series-connected resistors $202_0$ to $202_N$. The reference resistor row 202 is provided between the chip power terminal VCC and a ground terminal GND, in which the most upper resistor $202_N$ is connected to the power terminal VCC and the most bottom resistor $202_0$ is connected to the ground terminal GND. Each reference voltage is obtained as a voltage between two adjacent resistors in the reference resistor row 202. Each resistor functions as a voltage dividing resistor for dividing a constant voltage at the terminal VCC into N number of different reference voltages $Vref_0$, $Vref_1$, . . . , $Vref_{N-1}$. These voltages satisfy $Vref_0 < Vref_1 < \ldots < Vref_{N-1}$. It should be noted that these reference voltages are compared with voltages obtained by dividing a rectified voltage with a voltage divider, and thus these voltages are usually different from reference voltages $VREF_0$ to $VREF_{N-1}$ in FIG. 4.

Numeral 203 denotes a comparator circuit, which compares a voltage applied to the terminal $V_{SENSE}$ (hereafter referred to as $V_{SENSE}$ voltage, and the magnitude thereof is described as Vd) by the voltage divider 105 with the above plurality of different reference voltages thereby to generate a comparison result signal indicative of their magnitude relation. The comparator circuit is comprised of N number of comparators $203_0$ to $203_{N-1}$. Each comparator drives its output to: a low level logic when an inverting input voltage is not less than a non-inverting input voltage; and a high level logic when an inverting input voltage is less than a non-inverting input voltage. As shown in figure, each comparator has a $V_{SENSE}$ voltage as an inverting input and each reference voltage as a non-inverting input.

Specifically, the most upper comparator $203_{N-1}$ has a $V_{SENSE}$ voltage as an inverting input and a reference voltage $Vref_{N-1}$, as a non-inverting voltage, at a contact point between the upper most resistor $202_N$ and a resistor $202_{N-1}$ adjacent thereto in the reference resistor row 202. Subsequently, comparators $203_1$ and $203_0$ have reference voltages $Vref_1$ and $Vref_0$, as non-inverting inputs, at contact points between resistors $202_2$ (not shown) and $202_1$, and $202_1$ and $202_0$, respectively, in the same manner.

Numeral 204 denotes a lighting LED selection circuit, which turns on/off each switch element in a subsequent switch circuit in response to an output from the prior step of comparator circuit 203, and thereby designates an LED of the LED array 103 to be lit up or lit out. In the present embodiment, this circuit is comprised of N−1 number of two-input OR elements.

Two inputs of an OR element are connected to outputs of two comparators adjacent to each other in the comparator circuit. For example, one input of an OR element $204_1$ is connected to an output of a comparator $203_1$ and the other input thereof is connected to an output of a comparator $203_2$ (not shown) present directly above the comparator $203_1$. One input of an OR element $204_0$ is connected to an output of the comparator $203_1$ and the other input thereof to an output of a comparator $203_0$. Therefore, when one comparator has a high level output, two OR elements connected to that comparator have high level outputs. The reason for this connecting structure is that when attention is focused on one FET in the figure and a voltage between gate and source of that FET is controlled for the conduction (turning on) between drain and source of that FET, turning on of all the FETs below that FET in the figure can lower a gate voltage in relative to a potential of a terminal to be connected to the lowest voltage of an IC chip. This is convenient for circuit design. Further, since the IC chip exhibits voltage endurance characteristics at a relatively low voltage, this structure can reduce the risk of application of a high voltage to the IC chip.

Numeral 205 denotes a switch circuit for turning on/off a driving current to each LED in the LED array 103, that is, for switching whether to flow a driving current to each LED for lighting or to stop a driving current to each LED for lighting out. This switch circuit is comprised of a plurality of switch elements, and these switch elements may be transistor switches. In this embodiment, a DMOS transistor (hereafter referred to as DMOS switch) is adopted as a transistor, and N number of DMOS switches $205_0$ to $205_{N-1}$ constitute the switch circuit. Each DMOS switch is connected in parallel to a corresponding LED. More particularly, drain and source of each DMOS switch $205_0$ to $205_{N-1}$ are connected to anode and cathode of each corresponding LED $103_0, \ldots, 103_{N-1}$ in the LED array 103 via GND, and $V_0, \ldots, V_{N-2}$, or $V_{N-1}$ terminal of the chip 200.

The uppermost DMOS switch $205_{N-1}$ has a base directly connected to an output of the comparator $203_{N-1}$, and each of other DMOS switches has a base connected to an output of each corresponding OR element. When a certain OR element has a high level output, a DMOS switch connected to that OR element is turned on. Thus, no current flows through an LED connected between drain and source of that DMOS switch, resulting in lighting-out of the LED. This state is equivalent to a state wherein anode and cathode of the LED is electrically short-circuited through the DMOS switch. This state is herein called "LED is short-circuited". In addition, the state wherein a DMOS switch is turned off and a current flows through an LED is herein called "LED is lit up".

Figure 2:
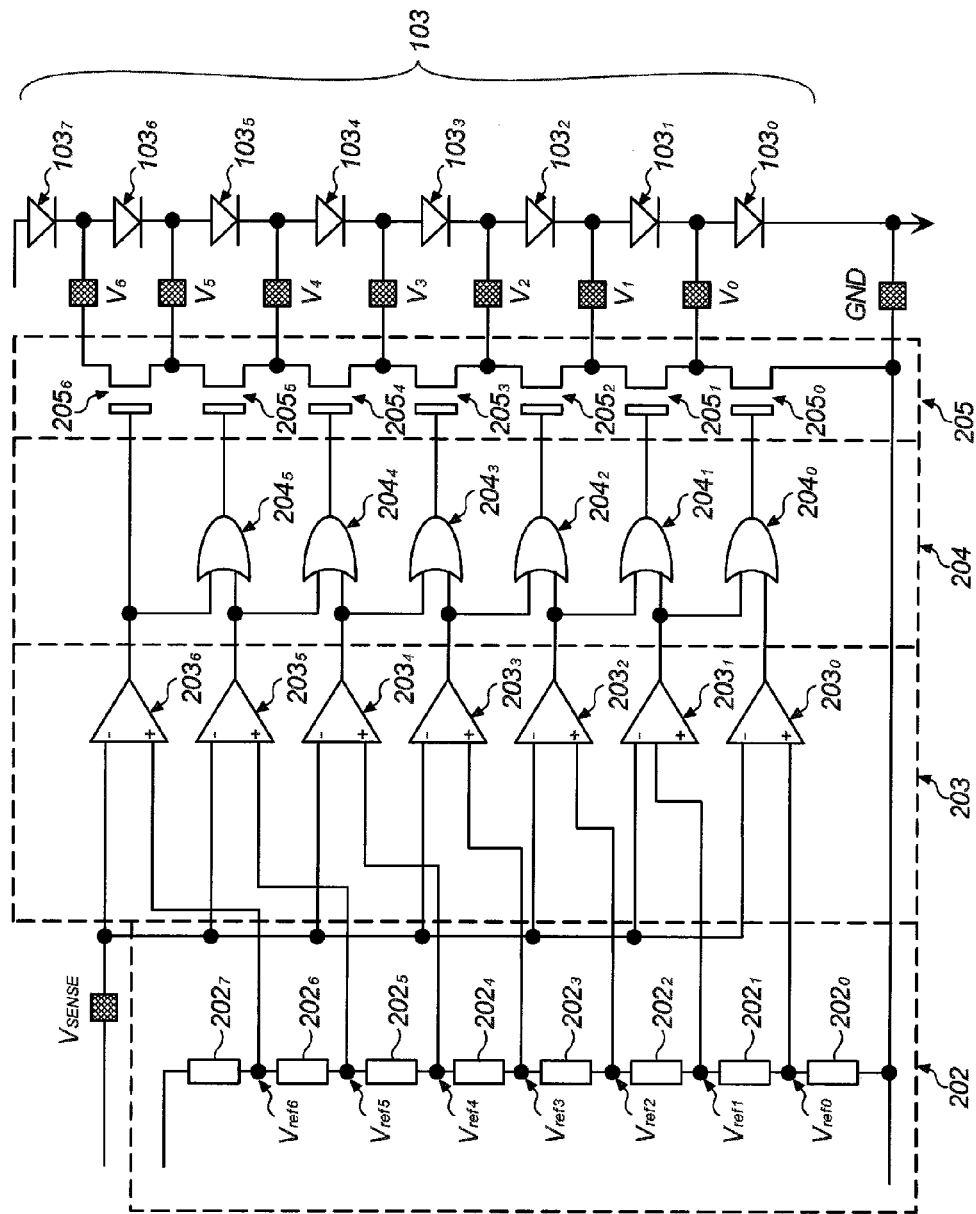
FIG. 2 shows a specific constitution example of FIG. 1 when N is 7.

Next, short-circuit/lighting control of LED by a control circuit 200 having the above constituent elements is described by referring to FIG. 2 showing a main section of the control circuit 200 when N=7 in FIG. 1. In the figure, the control circuit 200 controls lighting/short-circuit of seven (7) LEDs $103_0$ to $103_6$, and these seven LEDs are herein called particularly "controlled LEDs".

In this embodiment, when no LEDs of the LED array 103 are short-circuited, each reference voltage is set in response to voltage division ratio of the voltage divider in FIG. 1 so that a maximum number of LEDs that can be lit by a rectified voltage is 1, 2, 3, 4, 5, 7, or 8 while the rectified voltage is in a range corresponding to $V_{SENSE}$ voltage (Vd) range of $Vref_0 \leq Vd < Vref_1$, $Vref_1 \leq Vd < Vref_2$, $Vref_2 \leq Vd < Vref_3$, $Vref_3 \leq Vd < Vref_4$, $Vref_4 \leq Vd < Vref_5$, $Vref_5 \leq Vd < Vref_6$, or $Vref_6 \leq Vd$. Herein, when Vd is $Vref_0$, $Vref_1$, $Vref_2$, $Vref_3$, $Vref_4$, $Vref_5$, or $Vref_6$, a rectified voltage is the lowest voltage among such voltages that can light up 1, 2, 3, 4, 5, 6, or 8 LEDs at maximum when no LEDs of the LED array 103 are short-circuited. A rectified voltage corresponding to the range of $Vref_5 \leq Vd < Vref_6$ can light up at maximum of 7 LEDs. However, practically, the constitution of FIG. 2 enables lighting of 6 LEDs when $Vref_5 \leq Vd < Vref_6$.

In this regard, assuming that: the lighting LED selection circuit 204 of FIG. 2, for example, is removed; outputs of comparators $203_0$ to $203_6$ are connected directly to bases of corresponding DMOSs $205_0$ to $205_6$, respectively; and LED $103_7$ is removed, a maximum number of LEDs that can be lit up by a rectified voltage is set to 1, 2, 3, 4, 5, 6, or 7 when no LEDs of the LED array 103 are short-circuited, while the rectified voltage is in a range corresponding to $V_{SENSE}$ voltage (Vd) range of $Vref_0 \leq Vd < Vref_1$, $Vref_1 \leq Vd < Vref_2$, $Vref_2 \leq Vd < Vref_3$, $Vref_3 \leq Vd < Vref_4$, $Vref_4 \leq Vd < Vref_5$, $Vref_5 \leq Vd < Vref_6$, or $Vref_6 \leq Vd$. In addition, the maximum number of LEDs that can be lit up is identical with the number of LEDs that are practically lit up. Therefore, this constitution can always light up the maximum number of LEDs that can be lit up by a rectified voltage at any given point in time. Herein, the embodiment is described based on a lighting LED selection circuit 204 having the constitution shown in FIG. 2.

First, when $V_{SENSE}$ voltage (Vd) is lower than $Vref_0$, the device operates as follows. Since $V_{SENSE}$ voltage (Vd) is smaller than all the reference voltages, all the comparators have high level outputs. Therefore, all the DMOS switches are turned on, and all the LEDs $103_0$ to $103_6$ are short-circuited. Further, a rectified voltage at this time is not enough to drive even one LED. Consequently, all the LEDs including the uppermost LED $103_7$ are not lit up.

Next, when $V_{SENSE}$ voltage (Vd) is not lower than $Vref_0$ and lower than $Vref_1$, the outputs of comparators $203_0$ and $203_1$ are at low level and high level, respectively. One input of OR element $204_0$ is connected to the high level output of the comparator $203_1$, and thus DMOS switches $205_0$ and $205_1$ are both turned on. Therefore, LED $103_0$ and $103_1$ are short-circuited and not lit up. In this case, $V_{SENSE}$ voltage (Vd) is lower than any reference voltage of $Vref_1$ and voltages higher than $Vref_1$, and thus all of the comparator $203_1$ and ones existing upwardly therefrom have high level outputs. Therefore, all of the controlled LEDs are short-circuited and only one LED $103_7$, the uppermost one, is lit up.

Next, when $V_{SENSE}$ voltage (Vd) is not lower than $Vref_1$ and lower than $Vref_2$, the device operates as follows. The outputs of comparators $203_0$ and $203_1$ are both at low level, and the outputs of the comparator $203_2$ and ones existing upwardly therefrom are all at high level. Therefore, the output of OR element $204_0$ is at low level and the outputs of OR elements other than that are at high level. Then, only DMOS switch $205_0$ is turned off, so that only LED $103_0$ among controlled LEDs is not short-circuited. Therefore, in this case, two LEDs, the uppermost LED $103_7$ and LED $103_0$, light up.

Likewise, when $Vref_2 \leq Vd < Vref_3$, $Vref_3 \leq Vd < Vref_4$, or $Vref_4 \leq Vd < Vref_5$, $Vref_5 \leq Vd < Vref_6$, the number of LEDs that light up is 3, 4, 5, or 6, respectively.

Lastly, when Vd is not lower than $Vref_6$, Vd is higher than all the reference voltages and the outputs of all the comparators are at low level. Thus, all the DMOS switches are turned off and all of eight (8) LEDs including the uppermost LED $103_7$ light up.

In the above operation, it is understood that when Vd goes up to be $Vref_k$ ($0 \leq k \leq 5$) or more, the number of LEDs that light up when Vd reaches to $Vref_k$ is (k+1) at maximum (when reaches to $Vref_6$, the number is 8). When Vd goes down to be $Vref_k$ ($0 \leq k \leq 6$) or less, the number of LEDs that light up when Vd becomes lower than $Vref_k$ is k at maximum.

Figure 6:
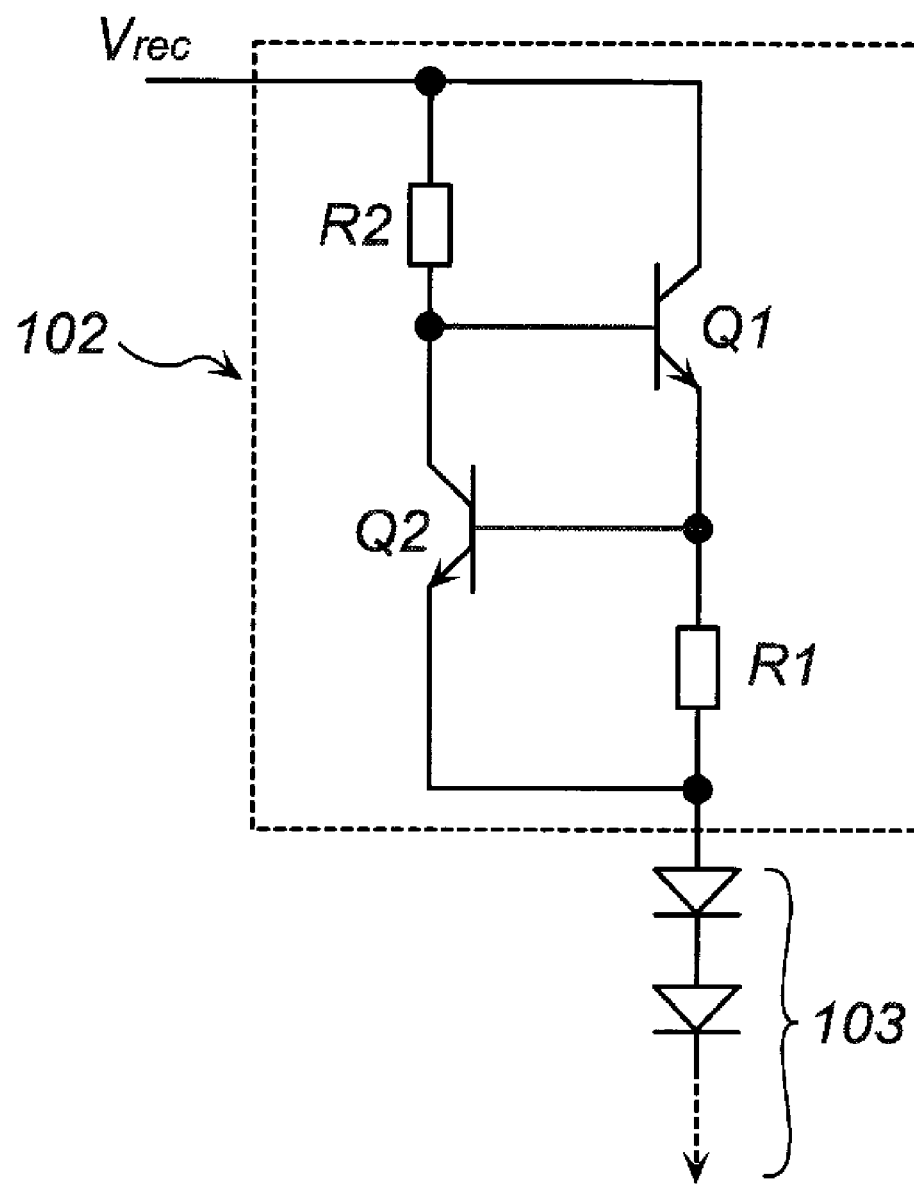
FIG. 6 shows an exemplary circuit of a floating current source of the LED lighting device of FIG. 1.

Next, the constitution and operation of the floating current source 102 in FIG. 1 is described by referring to FIG. 6 showing one exemplary constitution thereof. The floating current source 102 in the figure prevents the flow of a current having a certain value or more to the LED array (therefore, the floating current source 102 has overcurrent protection function). Transistors Q1 and Q2, resistors R1 (resistance value r1) and R2 (resistance value r2, r2>>r1). One terminal of the resistor R2 is connected to a collector of the transistor Q1, and the other terminal thereof is connected to a base of the transistor Q1 and a collector of the transistor Q2. The base and emitter of the transistor Q1 are connected to the collector and base of the transistor Q2, respectively. One terminal of the resistor R1 is connected to the emitter of the transistor Q1 and the base of the transistor Q2, while the other terminal is connected to the emitter of the transistor Q2. The LED array 103 is connected to a connection point between the emitter of the transistor Q2 and the resistor R1.

In the above constitution, a rectified voltage Vrec at a plus output terminal A (FIG. 1) of the rectifier circuit 101 is applied to the collector of the transistor Q1 and to the base of the transistor Q1 via the resistor R2. Application of Vrec supplies a base current to the transistor Q1 via R2 to turn on the transistor Q1. Then, an increase of the current flowing through the resistor R1 enables a voltage applied to the resistor R1 to be equal to a voltage $V_{BE}$ between the base and the emitter of the transistor Q2, and the transistor Q2 is turned on and a base current of the transistor Q1 decreases to turn off the transistor Q1. Accordingly, the current flowing through the LED array 103 is limited to at most $V_{BE}$/r1. This can prevent an increase of power loss caused by flowing of a current with a certain value or larger to the LED array.

It is desired that the total sum of forward voltages of LEDs to be lit in the LED array 103 is as approximated to an input voltage Vrec of the floating current source at that time as possible to minimize a voltage drop at Q1, thus attempting to obtain higher power efficiency. Further, such operation allows the floating current source to be formed by low-cost and low-voltage devices. In this regard, the present invention can light the maximum number of LEDs that can be lit by a rectified voltage at any given point in time, and therefore it is possible to minimize a voltage drop of the floating current source over the entire period of rectified voltage waveform.

2. Second Embodiment

Figure 7:
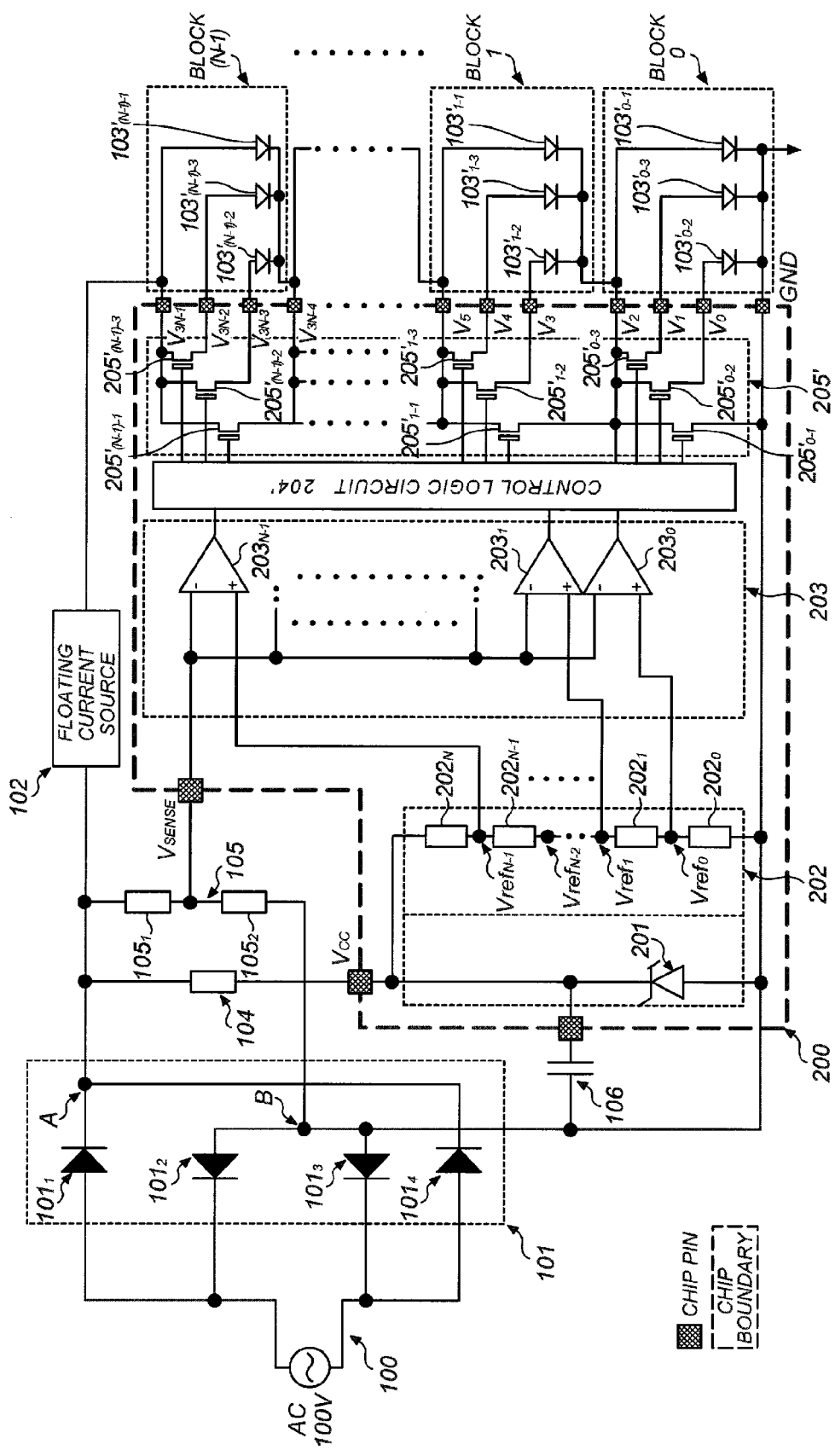
FIG. 7 is a schematic block diagram of an LED lighting device having a parallel arrangement of LEDs according to a second embodiment of the present invention.

Next, a second embodiment of the present invention is described by referring to FIG. 7. This embodiment has a constitution equivalent to one shown in FIG. 1 except that LEDs are arranged in parallel and a lighting LED selection circuit 204 and a switch circuit 205 are modified to a control logic circuit 204' and a switch circuit 205'. Thus, the remaining parts of this embodiment are the same as those shown in FIG. 1.

In FIG. 7, LEDs $103'_{0-1}$ to $103'_{(N-1)-3}$ are divided into N number of blocks each having three LEDs as indicated by dotted frames. These blocks include block 0 comprised of $103'_{0-1}$, $103'_{0-2}$, and $103'_{0-3}$; block 1 comprised of $103'_{1-1}$, $103'_{1-2}$, and $103'_{1-3}$; likewise, block 2, block 3, ..., block (N−2); and finally block (N−1) comprised of $103'_{(N-1)-1}$, $103'_{(N-1)-2}$, and $103'_{(N-1)-3}$. N represents an integer of not less than 1, which can be properly set depending on embodiment requirement.

In this embodiment, LEDs of each block are connected to corresponding FETs (field effect transistors $205'_{0-1}$ to $205'_{(N-1)-3}$) as shown in the figure. It is understood that the connection of this embodiment is a constitution wherein two structures with series-connected DMOSs and LEDs are connected in parallel in addition to the constitution of FIG. 1 comprising DMOSs $205_k$ (k=0 to N−1) and LEDs $103_k$ connected between source and drain of each DMOS. As a switch element of the switch circuit 205', FETs are used instead of DMOSs in FIG. 7, but, needless to say, DMOSs and other transistors may be used. Further, the number of constitutions with series-connected FETs and LEDs is two, but this number may be properly determined depending on embodiment requirement.

Three LEDs of the block 0, for example, are explained. The LED $103'_{0-1}$ is connected between source and drain of an FET $205'_{0-1}$ via terminals GND and $V_2$. LEDs $103'_{0-2}$ and $103'_{0-3}$ are connected in series to FETs $205'_{0-2}$ and $205'_{0-3}$ via germinal $V_0$ and $V_1$, respectively. Further, a structure of series-connected LED $103'_{0-2}$ and FET $205'_{0-2}$, and a structure of series-connected LED $103'_{0-3}$ and FET $205'_{0-3}$ are connected in parallel to FET $205'_{0-1}$. A control signal from the control logic circuit 204' is input to each base of FETs $205'_{0-1}$, $205'_{0-2}$, and $205'_{0-3}$, and each FET is controlled to be on or off in response to logic level of the control signal.

As shown in the figure, the connecting constitution between each LED and the corresponding FET in the block 0 is applied in the same manner to LEDs of other blocks. A block 1 is connected in series to the block 0, and likewise, blocks are connected in series up to a block (N−1).

As described above, in the second embodiment, each block comprises a plurality of LEDs, and FETs are connected in series to LEDs. Thus, the second embodiment approximates a consumption current waveform of LED to a source voltage waveform by properly performing logic design of a control logic circuit, thus providing an advantage in harmonic suppression of power source.

Further, the brightness can be controlled by adjusting the number of lighting LEDs without efficiency degradation. Furthermore, LEDs having different electric characteristics/optical characteristics can be used by each block and/or within each block. For example, LEDs having different colors may be used to change color tone.

Next, one exemplary LED lighting method according to the present invention is described. This method comprises the following steps 100 to 400.

a step of providing an LED array comprising a plurality of series-connected LEDs (Step 100)

a step of rectifying an AC power voltage (Step 200)

a step of supplying the rectified voltage to the LED array (Step 300)

a step of determining the magnitude of the rectified voltage (Step 400)

Step 400 may include a step of comparing a divided rectified voltage with a reference voltage so that the rectified voltage falls within a desired voltage range. Further, Step 400 may include a step of determining the magnitude of the rectified voltage in association with reference voltage. In other words, Step 400 may include a step of determining the magnitude of the rectified voltage by making comparison between the rectified voltage and one or a plurality of reference voltages. In this case, the number of lighting/short-circuited LEDs can be determined depending on the determined magnitude of rectified voltage. For example, when the rectified voltage is lower than the lowest reference voltage, the minimum number of LEDs are lit. As the largest reference voltage that is lower than the rectified voltage becomes higher, the number of lighting LEDs gradually increases. When the rectified voltage is higher than the highest reference voltage, the maximum number of LEDs are lit up.

The present invention is explained by exemplifying some embodiments, but not limited thereto. Thus, the present invention includes various modifications and alternatives to these embodiments. Some of these modifications and alternatives are exemplified below.

The exemplified embodiment is configured so that a divided rectified voltage is compared with a reference voltage. However, the scope of the present invention include direct comparison between a rectified voltage and a reference voltage without the voltage division of rectified voltage. In such a constitution, it is a matter of design how to configure reference voltage generation means and comparison means between a reference voltage and a rectified voltage.

Means for determining the magnitude range of a rectified voltage is not limited to a constitution wherein a rectified voltage is compared with one or a plurality of reference voltages. For example, lighting/short-circuit of each LED may be controlled depending on the magnitude of a difference between reference voltage and rectified voltage. Further, the magnitude of rectified voltage is measured by a known voltage detection circuit and, depending on the measured result, lighting/short-circuit of each LED may be controlled.

In the above exemplified embodiment, it is preferable to set such a reference voltage that a maximum number of LEDs drivable by a rectified voltage at any given point in time can be lit up from a viewpoint of efficient use of power source. However, the way of setting a reference voltage is a matter of design that can be achieved in consideration of power efficiency enhancement and other embodiment requirements.

The lighting LED selection circuit of the exemplified embodiment lights up controlled LEDs in sequence from one side to the other side of the LED array as the rectified voltage increases, while it short-circuits LEDs in a reverse direction against the above, that is in sequence from the other side to the one side as the rectified voltage decreases. However, the present invention is not limited to such a lighting sequence. For example, when the magnitude of rectified voltage is kept the same, LEDs at any location in the LED array may be short-circuited or lit up in response to increase or decrease of the rectified voltage while the number of short-circuited or lit-up LEDs is kept the same. LEDs to be short-circuited or lit up may be selected in consideration of electric characteristics/optical characteristics of LEDs.

In some cases, increments of individual reference voltages are constant (in this case, each reference resistor has the same resistance value in the exemplified embodiment), but in the other cases, increments thereof are different. When forward voltages of individual LEDs are different, for example, it is possible to set different incremental values of reference voltage depending thereon (in other words, a part or the entire reference resistors have different resistance values in the exemplified embodiment).

In the exemplified embodiment, one switch element is used to short-circuit/light up one LED. However, it is possible for one switch element to short-circuit/light up a plurality of LEDs. This can be achieved, for example, by connecting a plurality of LEDs in series between drain and source of each of any one or plural DMOS switches in the first embodiment.

The rectifier circuit is not limited to a full-wave rectifier circuit, but may be other rectifier circuit such as a half-wave rectifier circuit.

An impedance component such as a current-limiting resistor may be used instead of a floating current source. When an impedance component is used in the exemplified embodiment, the impedance component is connected in series between the plus output terminal A of the rectifier circuit 101 and the LED array 103.

The exemplified embodiment employs a Zener diode to generate a constant voltage, but a constant voltage generation circuit with other known constitution may be employed to generate a constant voltage.

A temperature compensation circuit may be added to the constitution of FIG. 6 to avoid temperature influence on the floating current source.

In the exemplified embodiment, the LED lighting control circuit is described as one mounted on one chip, but not limited thereto. For example, a part or the entire of such circuit may be constituted as an individual component.

The above embodiments present various values (resistance values, capacitance values, voltage values, etc.) simply as examples. Thus, it goes without saying that these values can be properly set depending on embodiment requirement.

As described above, the present invention allows efficient use of an AC source in an LED lighting device, and thus is suitable for a solid state lighting device using LEDs. Particularly, the adoption of high-brightness LEDs in an LED array preferably enables substitution for a fluorescent light or an incandescent light.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An LED lighting device comprising:
   a rectifier circuit for rectifying an AC source;
   an LED array having a plurality of series-connected LEDs;
   a floating current source connected in series between the rectifier circuit and the LED array; and
   control means for determining the magnitude of an output voltage of the rectifier circuit and, depending on the determination result, controlling the on/off of a driving current to each LED of the LED array.

2. The LED lighting device according to claim 1, wherein the control means is configured so as to light up a maximum number of LEDs of the LED array that can be lit up by the determined magnitude of the output voltage.

3. The LED lighting device according to claim 2, wherein, when an increased output of the rectifier circuit increases the maximum number of LEDs of the LED array, the control means determines that the output voltage of the rectifier circuit reaches to a minimum voltage as to enable the increased maximum number of LEDs to be lit, and, upon such determination, the control means lights up the increased maximum number of LEDs.

4. The LED lighting device according to claim 3, wherein the control means comprises comparison means for comparing the output voltage of the rectifier circuit with a predetermined reference voltage to generate a comparison result signal indicative of the magnitude relation there between.

5. The LED lighting device according to claim 4, wherein the control means comprises switch means for switching between ON and OFF of a driving current to each LED of the LED array in response to the comparison result signal.

6. The LED lighting device according to claim 5, wherein the control means comprises reference voltage generation means for generating a plurality of different reference voltages, and the switch means comprises a plurality of switch elements so that each switch element switches between ON and OFF of a driving current to one corresponding LED or a plurality of corresponding LEDs,
   wherein:
   the predetermined reference voltage is composed of the plurality of different reference voltages;
   the comparison means compares the output voltage of the rectified circuit with each of the plurality of different reference voltages, generates the comparison result signal indicative of the magnitude relation there between, and supplies the comparison result signal to a corresponding switch element of the plurality of switch elements; and
   each of the plurality of switch elements switches between ON and OFF of a driving current to the one corresponding LED or the plurality of corresponding LEDs in response to the comparison result signal.

7. The LED lighting device according to claim 6, wherein the comparison means comprises a plurality of comparators each having two inputs,
   wherein each of the plurality of different reference voltages is input to one input of each comparator and the output voltage of rectifier circuit is input to the other input, and each comparator makes comparison between the two inputs to generate each of the comparison result signals.

8. The LED lighting device according to claim 6, wherein each of the minimum voltages each capable of lighting a different maximum number of LEDs is identical with each of the plurality of different reference voltages.

9. The LED lighting device according to claim 1, comprising an impedance component instead of a floating current source.

10. The LED lighting device according to claim 6, wherein the switch element is a transistor.

11. The LED lighting device according to claim 10, wherein the transistor is a DMOS transistor.

12. The LED lighting device according to claim 1, wherein the control means lights up LEDs of the LED array in sequence from one direction as the output voltage of rectifier circuit increases, and then the lit LEDs maintain the lighting state.

13. The LED lighting device according to claim 1, further comprising voltage divider means for division of the rectified voltage, wherein the control means determines the magnitude of the divided voltage obtained by dividing the output voltage of rectifier circuit with the voltage divider means instead of the magnitude of the output voltage of rectifier circuit.

* * * * *